United States Patent [19]

Coulange

[11] 4,411,155
[45] Oct. 25, 1983

[54] SENSOR FOR DETECTING THE LEVEL OF LIQUID IN A TANK

[75] Inventor: Jean Coulange, Conflans Sainte-Honorine, France

[73] Assignee: e.d. Veglia, Paris, France

[21] Appl. No.: 278,566

[22] Filed: Jun. 29, 1981

[30] Foreign Application Priority Data

Jun. 27, 1980 [FR] France .................. 80 14377

[51] Int. Cl.³ .............................................. G01F 23/24
[52] U.S. Cl. ....................................................... 73/295
[58] Field of Search ............................................ 73/295

[56] References Cited

U.S. PATENT DOCUMENTS 3,205,709  9/1965  Gearing et al. ................. 73/295
3,302,458  2/1967  Scadron ........................ 73/295
3,496,773  2/1970  Cornish ......................... 73/295

FOREIGN PATENT DOCUMENTS 1266887  3/1972  United Kingdom .............. 73/295
263922   6/1970  U.S.S.R. ........................ 73/295

Primary Examiner—E. R. Kazenske
Assistant Examiner—Joseph W. Roskos
Attorney, Agent, or Firm—Jacobs & Jacobs

[57] ABSTRACT

A sensor for detecting the level of a liquid, comprising a conducting wire whose resistance has a high coefficient of temperature, the wire forming at least one pair of substantially parallel strands, adjacent connection pieces to which the ends of the wire are fixed, a tubular housing open at its upper and lower opposite ends, a spring having one end connected to the wire at the junction of its strands and its other end hooked to a lower holding piece fixedly mounted at the lower end of the tubular housing, and provided with an axial passage for a removable assembly spindle, an upper holding piece for holding the connection pieces, the upper holding piece being slidable in the tubular housing and fixedly mounted near the upper end of said housing and being provided with an axial passage with abutment for the removable assembly spindle.

5 Claims, 4 Drawing Figures

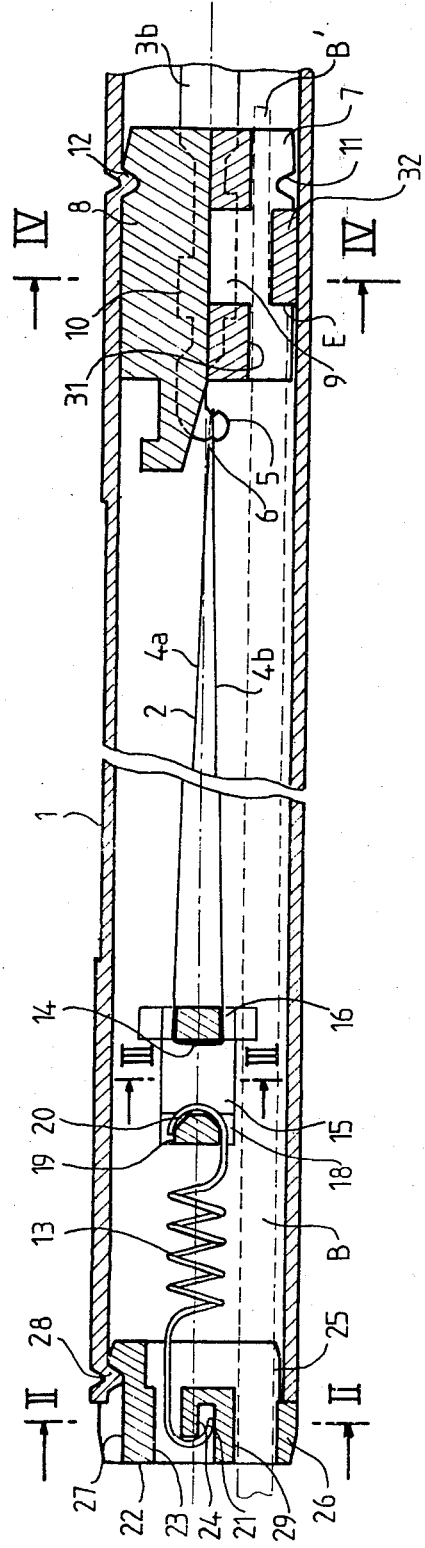

SENSOR FOR DETECTING THE LEVEL OF LIQUID IN A TANK

The present invention relates to a sensor for detecting the level of liquid in a tank, comprising a conducting wire of which the resistance presents a high coefficient of temperature.

To detect the level of a liquid, it is known to place a conducting wire with high coefficient of temperature in the tank and to apply a constant current thereto. If the level of liquid is low, most of the conductor is exposed to the air and its temperature, and therefore its resistance, increases. If, on the contrary, the conductor is entirely immersed in the liquid, its temperature is stable. The voltage at the terminals of the conductor is therefore representative of the level of liquid and this level may be determined by appropriate means.

In practice, it is important that a variation in the level of liquid brings about a virtually immediate variation in the resistance of the conductor. Consequently, the thermal inertia of the conductor must be as low as possible and this leads to the conductor being made in the form of a very fine, therefore very supple wire. However, the wire must then be stretched by an appropriate member such as a spring.

In addition, for obvious reasons of convenience, the wire forms at least one pair of substantially parallel strands fixed by their ends to connecting pieces, and the spring acts on the wire at the join of the strands. A rigid device must therefore be provided for maintaining the connecting pieces at one end and the spring at the opposite end.

This device may be made in the form of a tubular element whose length is slightly greater than that of a strand of wire, provided at one end with a means for hooking the spring and at the other end with a means for fixing the connecting pieces, the wire being placed inside said element which comprises openings allowing the liquid to enter. Such an element will be made in two halves which will be connected after the wire has been assembled.

The drawback of this solution is that the length of the tubular element must be adapted to the length of the strands of wire. Now, the latter length itself depends on the depth of the tank in question and therefore varies depending on the case, with the result that a particular model of tubular element must be provided for each possible case. This is disadvantageous from the point of view of standardisation of the products.

Consequently, it is an object of the invention to provide a level detection sensor whose structure is more favourable from the standpoint of standardisation.

The invention relates to a sensor for detecting a level of liquid, comprising a conducting wire whose resistance has a high coefficient of temperature, the wire forming at least one pair of substantially parallel strands, adjacent connecting pieces to which the ends of the wire are fixed, a spring acting on the wire at the join of the strands, a tubular spacer element surrounding the wire, and pierced with openings over its side wall, a piece fixed at one end of this spacer element for hooking the spring and a member for fixing the connecting pieces fixed inside the spacer element, on the opposite side, wherein the tubular spacer element is open at its two ends and the end piece for hooking the spring as well as the fixing member are adapted to be fitted on a removable assembly spindle, means being provided for successively allowing fitting of said end piece then of the fixing member and finally the abutment of said latter member.

With the arrangement according to the invention, comprising a spacer element distinct from the elements for hooking the spring and for fixing the connecting pieces, adaptation to the different depths of tank is obtained by modifying the length of the spacer element which is a simple tube. However, the end piece and the member for fixing the connecting pieces do not have to be modified as a function of the length of the wire.

The problem of introduction inside the spacer element is solved by previously assembling the different elements and by fitting the end piece and the member for fixing the conecting pieces on the assembly spindle. The assembly thus supported is introduced without difficulty inside the tubular spacer element.

The spindle has an end portion of narrow section on which is mounted the member for fixing the connecting pieces and a portion of wider section which receives the end piece for hooking the spring. The join of these two portions furnishes a bearing surface on which the above-mentioned fixing member may abut. The latter is thus rendered fast with the spindle during assembly.

The spacer element is advantageously fixed by crimping in recesses provided on the end piece and the member for fixing the connecting pieces.

The spring is appropriately stretched between the hooking piece and an intermediate piece around which the wire passes, the intermediate piece comprising a bearing surface for guiding the assembly spindle.

The openings for passage of the spindle are preferably rectangular in cross section. This enables the angular position of the different pieces to be set in the course of assembly.

The sensor according to the invention may be used in particular for detecting the level of oil in the sump of an automobile vehicle.

The invention will be more readily understood on reading the following description with reference to the accompanying drawings, in which:

FIG. 1 shows in axial section, to a large scale, the detection sensor according to the invention, in one embodiment thereof.

FIG. 2 is a section along plane II—II of FIG. 1.

FIG. 3 is a section along plane III—III of FIG. 1 of a piece of the sensor, the piece being shown rotated through 90°.

FIG. 4 is a section along plane IV—IV of FIG. 1.

Referring now to the drawings, the sensor for detecting the level of liquid comprises a rigid tubular spacer element 1, for example made of plastics material, disposed vertically in a liquid tank. One of the ends of the tube 1, to the right in FIG. 1, has not been shown. Holes (not shown) are made in the side wall of the tube 1 to allow the liquid to penetrate inside the tube.

The essential functional element of the sensor is a very fine conducting wire 2, whose ends are connected to respective connecting pieces 3a, 3b constituted by plates of conducting metal which are themselves connected to output conductors (not shown).

The conducting wire 2 is made of a material whose resistivity has a high coefficient of temperature, such as nickel-chromium. Depending on the level of the liquid in the tank, the degree of immersion of the wire 2 varies. As the part exposed to the air heats up more than the part immersed in the liquid, the temperature of the wire 2 varies depending on the level of liquid. This variation in temperature is translated by a variation in the electrical resistance of the wire, to which a constant current is applied, this enabling the level of liquid to be determined by an appropriate electrical circuit.

The electrical circuit in question does not form the subject matter of the present invention and it is unnecessary to describe it here. Howbeit, it belongs to the state of the art.

For the variations in level to be translated virtually immediately by variations in temperature of the wire, the thermal inertia of the wire must be arranged to be as low as possible and, for this reason, a very fine, therefore very supple, wire is used.

The wire 2 forms a loop with two substantially parallel strands 4a, 4b. The strands 4a, 4b are respectively connected to the connecting plates 3a, 3b, each comprising a lug 5 provided with a groove 6 for winding the end of the respective strand, the final connection being effected by welding on the lug 5.

The plates 3a, 3b are immobilised between two fixing pieces 7 and 8 of substantially semi-circular section. As shown in FIG. 1, the connecting plates comprise on their edges rectangular projecting portions 9, 10 which are engaged in recesses of corresponding shape provided in the fixing pieces 7 and 8.

The fixing pieces 7 and 8 have a groove 11 on their outer periphery enabling the tube 1 to be crimped on the pieces 7 and 8 for example at three equidistant points 12 as shown in FIG. 4.

The wire 2 is maintained stretched by a draw spring 13 which acts on the loop 14 joining the two strands 4a, 4b via a stirrup shaped element 15. The stirrup 15 is a hollow rectangular piece of which the transverse wall 16 comprises two small recesses 17 for receiving the loop 14. Similarly, the other transverse wall 18 comprises recesses 19 for receiving the loop-shaped end 20 of the spring 13.

The opposite end 21 of the spring 13, also in loop form, is hooked to an end piece 22. The piece 22 is provided with an opening 23 through which the spring 13 passes and a small recess 24 on the outside, in which the end loop 21 is engaged.

The piece 22 is substantially circular in cross section and comprises a narrow portion 25 on the spring side, of diameter smaller than the inner diameter of the tubular spacer element 1, and a wide portion 26 of diameter larger than the inner diameter of the tube 1, which is in frontal abutment on the end of the tube 1. Axial notches 27 are provided in a part of the narrow portion 25 and in the wide portion 26 to allow the tube 1 to be crimped at points 28, the diameter at the bottom of the notches being appropriately less than the diameter of the narrow portion 25.

The end piece 22 has an axial opening 29 of square section passing therethrough, allowing passage of an assembly spindle of square section, shown in broken lines in the drawings and designated by reference B.

The stirrup 15 comprises projections 30 in its transverse wall 16 defining therebetween a bearing surface for guiding the spindle B, as shown in FIG. 3.

The fixing piece 7 is arranged to allow passage of the end B' of the spindle, of narrower section, and to be in abutment on the shoulder E connecting the square section portion to part B'. It comprises to this end an opening 31 of square cross-section opening on the outer periphery of the piece 7, and a bridge-shaped portion 32 which partly closes the opening 31 so as to abut on said shoulder E and to allow passage only of the end B' of the spindle of narrower section.

The sensor is assembled as follows:

The strands of wire 4a, 4b are welded on the connecting plates immobilised between the pieces 7 and 8 and connected to output conductors after having passed the wire in the stirrup 15 to form the loop 14. The spring 13 is hooked, on the one hand to the stirrup 15 and, on the other hand, to the end piece 22.

The end piece 22, then the fixing piece 7 are fitted on the assembly spindle B until the piece 7 is in abutment against the shoulder E of the spindle. The spindle B further passes between the projections 30 of the stirrup 15 which is thus angularly immobilised.

The assembly thus borne by the spindle is introduced inside the tubular spacer element 1 until the wide part 26 of the end piece 22 comes into abutment with the end of the tube 1. As the pieces 7 and 8 are fast in translation with the spindle due to the abutment between the bridge-shaped part 32 and the shoulder E, then they occupy the appropriate position inside the tube 1, corresponding to the correct tension of the conducting wire 2.

The tube is then crimped at 12 on the fixing pieces 7 and 8 provided with the groove 11, and the end of the tube 1 is crimped on the end piece 22 in the notches 27. The spindle may then be withdrawn.

It is clear that, if the length of the wire 2 is to be modified, only the length of the tube 1 will have to be modified accordingly. The other pieces may remain exactly the same.

It must be added that the conducting wire 2 may form more than one pair of strands, for example four strands. In this eventuality, the fixing piece 8 comprises a lug 33 with a catch 34 around which the wire will pass.

What is claimed is:

1. A sensor for detecting the level of a liquid which comprises a conducting wire whose resistance has a high coefficient of temperature, the wire forming at least one pair of substantially parallel strands; adjacent connection pieces to which the ends of said wire are fixed; a tubular housing open at its upper and lower opposite ends; a spring having one end thereof connected to said wire at the junction of said strands; a removable assembly spindle; a lower holding piece fixedly mounted at the lower end of said tubular housing and provided with an axial passage for said removable assembly spindle, the other end of said spring being hooked to said lower holding piece; and an upper holding piece for holding said connection pieces, said upper holding piece being slidable in said tubular housing and fixedly mounted near the upper end of said tubular housing and being provided with an axial passage with abutment for said removable assembly spindle.

2. The sensor of claim 1, wherein said upper holding piece comprises, facing said lower holding piece, a first passage having nearly the same section as that of said lower holding piece followed by a narrower passage defining with said first passage a first shoulder and said assembly spindle is provided with a second shoulder which defines said abutment of said spindle against said upper holding piece.

3. The sensor of claim 1, wherein said upper and lower holding pieces are provided with recesses for crimping said tubular housing.

4. The sensor of claim 3, wherein said lower holding piece comprises a narrow portion engaged inside said tubular housing and a portion of larger diameter connected by a radial surface in abutment on the end face of said housing, notches being provided at least in the outer surface of the narrow portion for crimping said housing.

5. The sensor of claim 1, further comprising an intermediate piece around which said wire is wound and which is provided with means for guiding said assembly spindle.

* * * * *